United States Patent [19]

Seo

[11] Patent Number: 4,902,532

[45] Date of Patent: Feb. 20, 1990

[54] METHOD FOR PREPARING LEAD-ACID ELECTROCHEMICAL CELL ELECTRODE PLATES

[75] Inventor: Eddie T. Seo, Littleton, Colo.

[73] Assignee: Gates Energy Products, Inc., Gainsville, Fla.

[21] Appl. No.: 390,318

[22] Filed: Aug. 3, 1989

[51] Int. Cl.⁴ .............................................. B05D 5/12
[52] U.S. Cl. ................................................... 427/58
[58] Field of Search .......................................... 427/58

Primary Examiner—Bernard Pianalto
Attorney, Agent, or Firm—C. H. Castleman, Jr.; H. W. Oberg, Jr.

[57] ABSTRACT

Extrusion coating of electrode plates for lead-acid electrochemical cells is enhanced by mixing an ionic water soluble organic dispersant in to the aqueous-based lead paste.

6 Claims, No Drawings

METHOD FOR PREPARING LEAD-ACID ELECTROCHEMICAL CELL ELECTRODE PLATES

BACKGROUND OF THE INVENTION

This invention relates to the fabrication of electrode plates for lead-acid electrochemical cells, and more particularly to a processing aid for improving the characteristics of slurry-type lead battery pastes.

Lead-acid electrode plates are typically prepared by mixing oxides of lead or blends thereof with a dilute solution of sulfuric acid. A blend of litharge (PbO) and red lead ($Pb_3O_4$) may be used for the positive plate and leady oxide, consisting of mainly litharge with added free lead particles, is commonly used for the negative plate. Various bulking agents may be employed, expanders for the negative plate to prevent densification and loss of capacity during cycling, and various other additives. In the conventional process the addition of sulfuric acid to the blend of lead oxides and other additives results in an exothermic reaction. The paste readily becomes very "stiff", and dough-like in consistency. Typically this stiff, sulfated paste is applied with an open-feed gear pump discharging onto a moving conductive substrate of lead grid or expanded mesh, for instance. Generally a doctor blade is used to scrap off the excess paste. It is generally impossible with this process to apply a constant volumetric flow rate of paste to a given length of grid and, hence, the amount of electrochemically active lead material applied to a given area of grid may vary from plate to plate.

An aqueous-based, slurry-type paste considerably more fluid than the conventional stiff, dough-like pastes was developed for sealed lead-acid cells and batteries of the type disclosed in U.S. Pat. No. 3,862,861 (McClelland et al.). By using an aqueous vehicle or lesser concentration of sulfuric acid the resultant viscosity of these slurries is considerably less than the traditional pastes, allow pumping and metering in a continuous fashion, as taught in U.S. Pat. No. 3,814,628 (Larkin). These slurry-type pastes of lower viscosity are compatible with soft, pure lead grids of the type preferred in the aforementioned U.S. Pat. No. 3,862,861, and may be continuously extrusion coated onto a moving substrate.

Continuous extrusion coating processes of this type result in application of substantially a precise amount of paste per length of grid resulting in uniformity in discharge capacity of the resultant plate. Processes and apparatus for extrusion coating slurry-type pastes of this kind are disclosed in U.S. Pat. No. 3,894,886 (Pankow et al.) and U.S. Pat. No. 4,050,482 (Ching et al.). Slurry pastes of the type contemplated hereunder, whether formulated with water only, or lightly sulfated with the appropriate levels of dilute sulfuric acid, produce thixotropic slurries of a suspension of fine solid particles in an aqueous vehicle.

These finely divided particles of solids of lead and lead oxides are generally macromolecular in size and naturally tend to settle. To keep the lead and lead oxide solids suspended in the liquid vehicle, nonionic thickeners, notably hydroxypropyl cellulose (e.g. Klucel supplied by Hercules Inc.) has been used as a processing aid to increase slurry fluidity by reducing its viscosity, and to retard settling. However, nonionic thickeners of this type present a number of drawbacks. The hydroxypropyl cellulose thickener must be premixed with water, rather than being added directly to the paste mixer as a powder. The hydroxypropyl cellulose solution foams. Furthermore, the hydroxypropyl cellulose thickener in solution undergoes acid catalyzed hydrolysis and the solution is slightly acidic (with sulfuric acid) to minimize transformation of massicot (yellow, rhombic lead oxide) to litharge (red, tetragonal lead oxide). Hydrolysis of the hydroxypropyl cellulose thickener leads to solutions of lower viscosity (lower molecular weight), complicating process control.

Furthermore, cells made with hydroxypropyl cellulose thickener as a processing aid are retained within the cell, and may degrade cell performance since at least the carbon black portion of the expander e.g. including barium sulfate and lining sulfonate, does not appear to be uniformly dispersed in the paste slurry. Additionally, the hydroxypropyl cellulose thickener does not permit achievement of a sufficiently high solids content in the paste as desired, resulting in producing negative plates in particular which are lower in bulk density than desired. The high discharge rate performance of cells made with hydroxypropyl cellulose thickener also appears to be impaired.

It is an object of this invention to produce electrode plates for lead-acid cells by applying slurry-type suspensions onto a suitable substrate using a processing aid which permits extrusion of a dense but fluid (workable) slurry onto a suitable substrate.

It is a further object to prepare such an electrode using a processing aid which can be added as a solid directly to the electrode powder mix, which is stable during cell manufacture e.g. resisting hydrolysis, and which disperses the negative plate expander and retards settling of the solid contents of the slurry during processing.

It is a further object to provide the aforementioned processing aid and not degrade cell performance and, in fact, enhance high discharge rate performance.

SUMMARY OF THE INVENTION

Briefly described, the aforementioned objects are met, in one aspect, by a method for preparing an electrode plate for a lead-acid electrochemical cell, including the steps of mixing an electrochemically active lead material, an aqueous based vehicle and an ionic water soluble organic dispersant to form an extrudable paste slurry, providing a substrate, and extrusion coating the paste slurry onto the substrate.

PREFERRED EMBODIMENTS OF THE INVENTION

The method of the invention is applicable to the fabrication of positive as well as negative electrode plates for lead-acid electrochemical cells (and batteries). According to the invention an electrochemically active lead material or mixture of active materials is mixed with an aqueous-based vehicle and an ionic water soluble organic dispersant to form an extrudable paste slurry. It is preferred to blend the dry ingredients including the dispersant, add first into the aqueous-based vehicle, and then mix by stirring, blending, or the like, in a single mixing operation.

Although the ingredients of the respective pastes may differ, including the presence of various additives as desired for specific performance characteristics of the cell, a typical slurry-type positive paste in accordance with the invention may include for instance more or less 75 percent by weight of litharge and 25 percent by weight of red lead. To these components may be added bulking agents in the order of 0.05 percent to 0.2 percent by weight. The dispersant is added in the amount from about 0.02 to about 2 weight percent based on the total solids content. To the foregoing mixture sufficient water is added to obtain a paste having a density of about 3.6 to about 4.8 gm/cc. Alternatively, where a slightly sulfated paste is desired e.g. for automotive SLI (starting lighting ignition) applications, a dilute solution of sulfuric acid may be added to the dry components of the mixture, for instance sulfuric acid having a specific gravity of about 1.400. The sulfation levels in this instance should be kept sufficiently low to prevent the paste from becoming stiff or dough-like, as opposed to a suspension of solids as a slurry which is pumpable or extrudable in accordance with the invention.

In a similar manner, the negative paste may be comprised essentially of, for example, about 80 percent litharge plus essentially 17 percent by weight of small free-lead particles. To this may be added about 1 to about 3 percent by weight of expander-type materials usually barium sulfate, carbon black and lignosulfonate (a basically nonwater-soluble mononuclear phenyl propane derivative). To this mixture is added the dispersant of the invention generally at about the same loading levels as with the positive plate together with water or a dilute solution of sulfuric acid, typically about 0.1 weight percent, to obtain a paste material having a density of from about 3.6 to about 5.5 gm/cc of mixture.

In accordance with the invention, an ionic water-soluble organic dispersant is employed which imparts increased fluidity (i.e. lower viscosity) of the active material slurry to the extent that such paste slurry is extrudable through a paste applicator die such as the applicator nozzles employed in U.S. Pat. No. 3,814,628 and 4,050,482. These extrusion-type dies or applicators are adapted to receive haste slurries at a constant volumetric flow rate from pumps of the positive displacement type, notably progressing cavity type using the Archimedes' screw principle (e.g. Moyno type).

The dispersants of the invention have the ability to stabilize and to reduce the viscosity of high solids aqueous inorganic slurries of the type contemplated. The preferred dispersants are anionic polynuclear aromatic compounds which have a hydrophilic backbone which is adsorbed onto the surface of the suspended lead or lead-oxide particle. This is believed to impart a negative charge to the suspended particle which then repel one another. The lessening of the attractive forces between particles aids in breaking up flocs or agglomerants and forces each particle to act as a single unit. The result is a true dispersion, containing particles of optimum fineness with no appreciable agglomeration. Unlike surfactants, these dispersants of invention do not lower surface or interfacial tension and, hence, they have little or no tendency to create foam. The most preferred materials are synthetic naphthalene sulfonic acid condensates, most preferably formaldehyde naphthalene sulfonic acid condensates. Although not narrowly critical, these condensates have an average number of monomer units in the range from about 6 to about 50 (i.e. a molecular weight from about 1,450 to about 12,150), more preferably a monomer unit average of from about 7 to about 12, most preferably 9. The dispersant is in form of a salt, particularly the alkali metal and alkaline earth metal salts, most preferably sodium salt of polymerized naphthalene sulfonic acid having the following basic repeating unit:

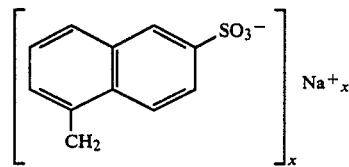

A preferred material of the above type is available under the trade name DAXAD 19, supplied by W. R. Grace and Co. of Lexington, MA U.S.A. DAXAD 19 is a commercially available dispersing agent typically used to stabilize and reduce the viscosity of high solids aqueous inorganic slurries and organic dispersions, for instance slurries of cement, gypsum, coal, clay, etc.

The sodium salt of naphthalene sulfonic acid formaldehyde condensation product is also known to improve charge acceptance and increase life in a negative lead-acid electrode plate, by introduction into the negative plate or the electrolyte, according to U.S. Pat. No. 3,481,785 (Ikari). This patent does not suggest that the sodium salt additive of naphthalene sulfonic acid formaldehyde condensation product would serve as a processing aid by fluidizing and stabilizing slurry-type paste. In that patent a lead grid is filled with a paste which is made by kneading a mixed powder of a lead oxide powder and an additive with dilute sulfuric acid i.e. the paste is of a dough-like consistency of conventional rather that slurry type.

After the electrochemically active lead material, water and/or dilute sulfuric acid and the ionic water soluble organic dispersant are thoroughly mixed to firm a paste slurry, a substrate of desired configuration is extrusion coated with the paste slurry, for instance using the method and apparatus taught in U.S. Pat. No. 3,814,628 or 4,050,482, both of which are incorporated herein by reference. Accordingly, a suitable lead or lead-coated grid of perforated or expanded mesh material may be delivered continuously to a suitable extrusion coating device, for instance of single or double cavity type, supplied by a positive displacement pump delivering a constant volumetric flow rate to the passing grid. The grid in known manner picks up paste as a coating on both sides of the grid as well within the interstices of the grid. The pasted grid may then be sized by a cut-off mechanism, or more preferably delivered through rollers which apply separator pasting paper or removable pasting paper to both sides of the grid and the calendar rolls somewhat compacting the paste onto the grid with the pasting paper interposed. The resulting pasted grid, in known manner may then be sized and matched with opposite polarity plates, separated by interposed separator of desired construction. A cell may then be formed in known manner by stacking or winding such opposite polarity plates, stuffing into a suitable container, forming suitable intracell as well intercell connections and terminal leads, applying and sealing a cover to the container, adding electrolyte forming, and the like.

An advantage of the method of the invention is the ability to continuously extrusion coat grid delivered from a large roll in continuous fashion. The grid may be profiled with suitable current collection tabs either prior to or after pasting. This continuous process obviously leads to economies in manufacturing and consistency of plate as a constant volume of electrochemically active material is applied to a given area of grid substrate. This, in turn, leads to consistency in product with less variation in capacity from cell to cell.

In one working example of the invention, commercially available 6 volt D monoblocs of the type illustrated in U.S. Pat. No. 4,592,972 (Juergens et al.) were constructed and standard production controls using Klucel thickener as a processing aid in both the positive and negative plates were compared in their high-rate cycling performance against the same 6 volt D monobloc batteries employing DAXAD 19 dispersant in both the positive (0.065 weight percent of solids) and negative (0.048 weight percent of solids) electrode plates as a substitute for Klucel. Four batteries (12 cells) were employed for the controls and the cells of the invention. The batteries were discharged at the 2C rate (5 A) and recharged at 7.5 volts, with this charge/discharge regime replicated three times per day. The batteries of the invention employed sulfuric acid electrolyte of 1.328 specific gravity and the controls used sulfuric acid electrolyte of 1.343 specific gravity. After 77 cycles the cells of the invention had delivered a mean capacity of 1.53 Ah, somewhat above 100 percent of rated capacity. The controls using Klucel thickener, on the other hand, after cycle 78 delivered 1.08 Ah, approximately 80 percent of rated capacity. These tests were performed at 23° C.

In another example, similar to the above, the same types of batteries of the invention and controls were subjected to room temperature C/5 discharge cycling and the performance between the controls and cells of the invention were comparable.

While certain representative embodiments and details have been shown for the purpose of illustrating the invention, it will be apparent to those skilled in this art that various changes and modifications may be made therein without departing from the spirit or scope of the invention.

What is claimed is:

1. A method for preparing an electrode plate for a lead-acid electrochemical cell, comprising the steps of:
    (a) mixing an electrochemically active lead material, an aqueous-based vehicle and an ionic water soluble organic dispersant to form an extrudable paste slurry;
    (b) providing a substrate; and
    (c) extrusion coating said paste slurry on to said substrate.

2. The method of claim 1 wherein the dispersant is an anionic polynuclear aromatic compound.

3. The method of claim 2 wherein the dispersant is a synthetic naphthalene sulfonic acid condensate.

4. The method of claim 3 wherein the dispersant is a nonfoaming sodium salt of polymerized naphthalene sulfonate having the basic repeating unit

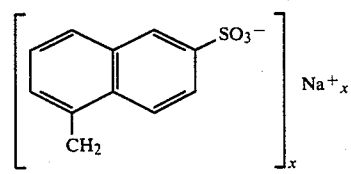

5. The method of claim 4 wherein the naphthalene sulfonate has a monomer unit mean of from about 6 to about 50.

6. The method of claim 1 wherein the extrusion coating step is performed continuously by continuously delivering a long strip of substrate through an extrusion coating device.

* * * * *

UNITED STATES PATENT AND TRADEMARK OFFICE
CERTIFICATE OF CORRECTION

PATENT NO. : 4,902,532

DATED : Feb. 20, 1990

INVENTOR(S) : Eddie T. Seo

It is certified that error appears in the above-identified patent and that said Letters Patent is hereby corrected as shown below:

Column 2, line 14, delete "lining" and insert therefor --lignin--.

Column 3, line 37, delete "haste" and insert therefor --paste--.

Signed and Sealed this

Twelfth Day of March, 1991

Attest:

HARRY F. MANBECK, JR.

*Attesting Officer*       *Commissioner of Patents and Trademarks*